United States Patent [19]
Coté

[11] 3,912,442
[45] Oct. 14, 1975

[54] CONNECTOR FOR PHOTOFLASH ARRAY

[75] Inventor: Paul T. Coté, Cleveland Heights, Ohio

[73] Assignee: General Electric Company, Schenectady, N.Y.

[22] Filed: Aug. 21, 1974

[21] Appl. No.: 499,316

[52] U.S. Cl. .................. 431/95; 240/1.3; 174/68.5
[51] Int. Cl.² ......................................... F21K 5/02
[58] Field of Search......... 339/147 R, 147 P, 198 R; 431/93, 94, 95, 95 A; 240/1.3; 174/68.5

[56] References Cited
UNITED STATES PATENTS

| | | | |
|---|---|---|---|
| 2,766,436 | 10/1956 | Luebking | 339/198 R |
| 3,149,266 | 9/1964 | Lipton | 174/68.5 |
| 3,458,270 | 7/1969 | Ganser et al. | 431/95 |
| 3,598,984 | 8/1971 | Slomski | 240/1.3 |
| 3,598,985 | 8/1971 | Harnden | 240/1.3 |
| 3,619,590 | 11/1971 | Meulemans et al. | 240/1.3 |
| 3,747,210 | 7/1973 | Kroll | 174/68.5 |
| 3,748,985 | 7/1973 | Brandt | 240/1.3 |

FOREIGN PATENTS OR APPLICATIONS

| | | | |
|---|---|---|---|
| 1,277,722 | 10/1961 | France | 339/147 R |
| 175,898 | 7/1961 | Sweden | 339/198 R |

OTHER PUBLICATIONS
Electrical Manufacturing, Jan. 1953, pp. 78–83.

*Primary Examiner*—Carroll B. Dority, Jr.
*Attorney, Agent, or Firm*—Norman C. Fulmer; Lawrence R. Kempton; Frank L. Neuhauser

[57] ABSTRACT

A multiple flash lamp unit is provided with connector terminals on the sides of connector tabs. The tabs are deformed between the terminals, such as by providing grooves, ribs, or slots, to increase the electrical leakage path between the terminals.

8 Claims, 7 Drawing Figures

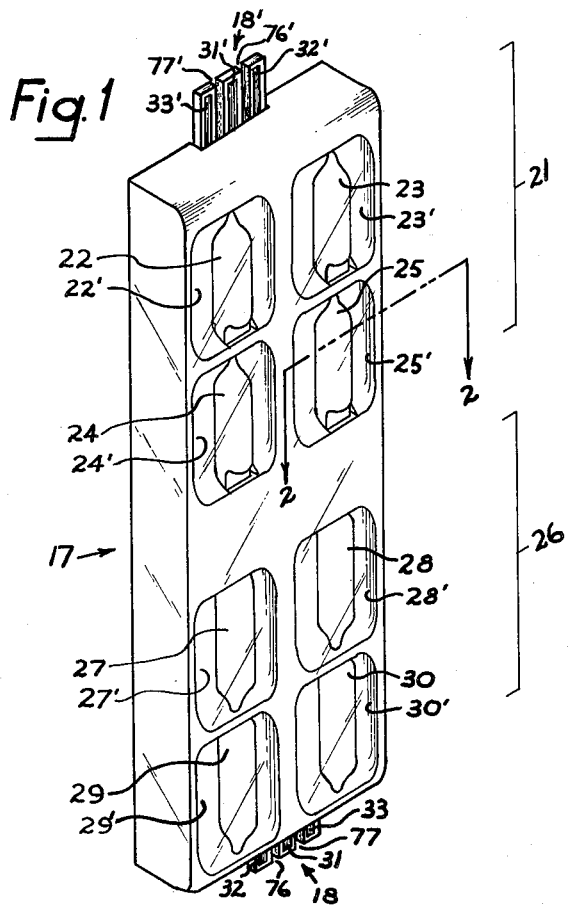
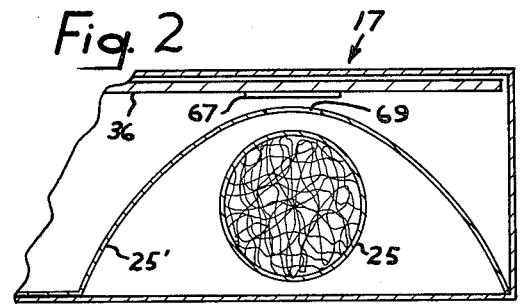
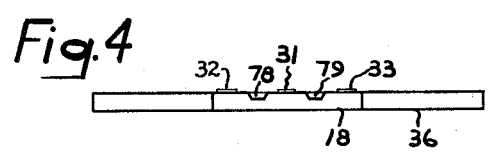
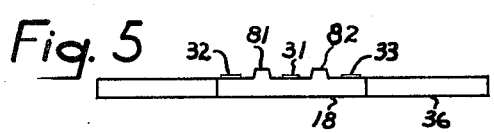
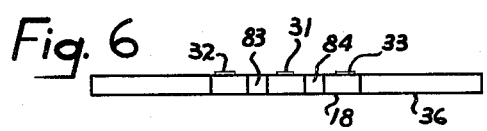
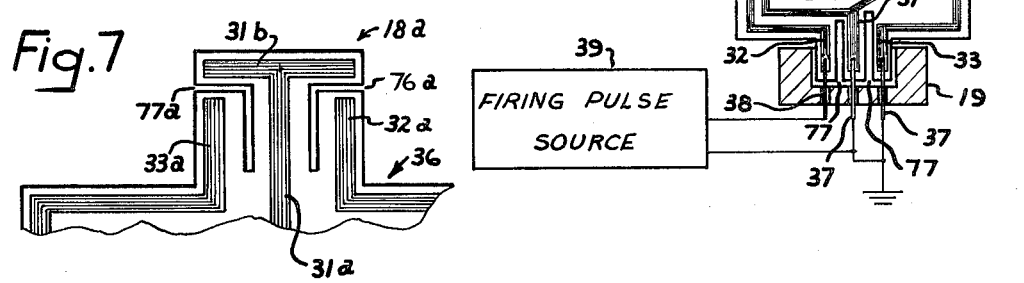

CONNECTOR FOR PHOTOFLASH ARRAY

CROSS-REFERENCES TO RELATED APPLICATIONS

Ser. No. 448,671, filed Mar. 6, 1974, Kurt H. Weber, "Multiple Flash Lamp Unit", assigned the same as this invention.

Ser. No. 485,459, filed July 3, 1974, Richard Blount, "Multiple Flash Lamp Unit", assigned the same as this invention.

Ser. No. 485,422, filed July 3, 1974, Paul T. Coté, "Multiple Flash Lamp Unit", assigned the same as this invention.

Ser. No. 485,460, filed July 3, 1974, Paul T. Coté, "Protective Terminal for Multiple Flash Lamp Unit", assigned the same as this invention.

BACKGROUND OF THE INVENTION

The invention is in the field of multiple photoflash lamp units, such as planar arrays.

U.S. Pat. Nos. 3,598,984 to Stanley Slomski and 3,598,985 to John Harnden and William Kornrumpf disclose a mulltiple flash array having first and second groups of flash lamps and reflectors facing in mutually opposite directions. The array is plugged into the camera whereby the first group of lamps faces frontwardly and is connected for the lamps to be flashed. When these lamps have been flashed, the array is turned around and the lamps of the second group face frontwardly and are connected to be flashed. The lamps usually are flashed one at a time; however, a plurality of lamps can be flashed simultaneously if more light is desired.

The above-referenced patent applications disclose multiple flash lamp units that can be connected to a camera in different orientations in each of which a different group of the flash lamps is relatively farther from the camera lens axis than are the other lamps of the unit. The lamps and electrical circuitry are arranged so that in any of the orientations of the unit with respect to the camera, only the group of lamps relatively farther from the lens axis can be flashed. The purpose of such an arrangement is to position the "active" group of flash lamps farther above the camera lens, in order to reduce the possibility of a "red-eye" effect that causes the pupils of a person's eyes to appear red or pink in flash pictures taken when the flash lamp is close to the camera lens.

The multiple flash lamp units have plug-in connector tabs each provided with a plurality of electrical connection terminals in the form of conductive stripes printed on or otherwise attached to the tabs. The various connector terminals are connected to individual lamps or to sequential firing circuitry interconnected with lamps in the unit. Such flash units, and particularly if they employ high voltage types of flash lamps which are flashed by aa high voltage pulse (1000 or 2000 volts, for example) of low current energy, may fail to flash their lamps if there is dirt or moisture on the connector tab between terminals and which shorts out some of the firing pulse energy. The same difficulty can occur when an array has been grasped at a connector tab so as to deposit skin oil or moisture on the tab.

SUMMARY OF THE INVENTION

Objects of the invention are to provide an improved flash lamp unit and to increase the reliability of lamps flashing properly.

The invention comprises, briefly and in a preferred embodiment, a multiple flash lamp unit having a connector provided with electrical terminals thereon and adapted to be plugged into a socket having contactors for contacting the connector terminals. The connector of the flash unit is provided with deformations between adjacent terminals to increase the electrical leakage path. The deformations can be in the form of grooves, ribs, or slots, and preferably have sharp edges to obstruct the formation of a continuous film of dirt, moisture, or other matter between the terminals.

BRIEF DESCRIPTION OF THE DRAWINGS

FIG. 1 is a perspective view of a multiple flash lamp unit in accordance with a preferred embodiment of the invention.

FIG. 2 is a cross-sectional view of a portion of FIG. 1, taken on the line 2—2 thereof.

FIG. 3 is a front view of a circuit board to which flash lamps are connected in the multiple lamp unit, shown plugged into a socket.

FIGS. 4, 5, and 6 are end views of circuit boards respectively having grooves, ribs, and slots in accordance with alternative preferred embodiments of the invention.

FIG. 7 is a side view of an alternative connector configuration.

DESCRIPTION OF THE PREFERRED EMBODIMENT

A multiple flash lamp unit 17, shown as being of the planar array type and containing a plurality of electrically fired flash lamps, is provided with a plug-in connector tab 18 at the lower side or end thereof, adapted to fit into a socket 19 (FIG. 3) of a camera or flash adapter. The lamp array 17 is provided with a second plug-in connector tab 18' at the top side or end thereof, whereby the array 17 is adapted to be attached to the socket 19 in either of two orientations, i.e., with either the tab 18 or the tab 18' plugged into the socket 19. The array 17 is provided with an upper group 21 of flash lamps 22, 23, 24, and 25, and a lower group 26 of flash lamps 27, 28, 29, and 30. Reflectors 22', etc., are disposed behind the respective flash lamps, so that as each lamp is flashed its light is projected forwardly of the array 17. The relationship of each reflector to its associated lamp, and a suitable plastic housing and transparent front cover, may be generally as is disclosed in the above-referenced planar array patents.

With the orientation of the array 17 plugged into the socket 19 as shown in FIG. 3 only the upper four lamps of the array, which constitute the upper group 21, can be flashed, and the four lamps of the lower group 26 are inactive and will not flash. Thus, the above-described undesirable red-eye effect is reduced or eliminated, since the only lamps of the array that can flash are grouped relatively far from the socket 19 and hence from the axis of the camera's lens. The array 17 can be removed from the socket 19, either before or after all lamps of the upper group 21 have been flashed, and turned around, with the upper tab 18' now the lower tab which is inserted into the socket 19, whereupon the group 26 of lamps becomes the upper group, and its lamps are flashed, again reducing or eliminating the red-eye effect because the active lamps are relatively farthest from the socket 19 and hence from the axis of the camera's lens.

Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab for connecting the upper or active group of lamps to the socket 19. Thus, tab 18 is provided with a pair of electrical terminals 31 and 32, and the tab 18' is provided with a pair of terminals 31' and 32'. Each tab is provided with a third terminal 33 and 33', respectively, which functions to electrically short the circuitry of the inactive lower group of lamps, as will be described.

FIG. 3 shows a circuit board 36 for the embodiment of FIG. 1 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The top and bottom halves of the printed circuitry are reverse mirror images of each other.

The camera socket 19 for the flash unit 17 is provided with a pair of contacts 37 and 38 which respectively electrically engage the terminals 31 and 32 (or 31' and 32') of the flash unit when it is plugged into the socket 19. A third contact 37' is electrically connected to contact 37 and engages the third terminal 33 (or 33') of the circuit board.

A firing pulse source 39, which may be contained within a camera or flash adapter, is connected to the contacts 37 and 38 of the socket 19. The type of firing pulse produced by the source 39 and applied across the contacts 37 and 38 will of course depend on the type of lamps used in the flash unit 17. If low voltage filament types of flash lamps are employed in the unit 17, the firing pulse source 39 may be a battery or battery-capacitor discharge type, producing, in synchronization with opening of the camera shutter, a pulse of approximately 3 volts to 15 volts or more and of sufficient energy to fire a single flash lamp. An example of a low voltage flash lamp is disclosed in U.S. Pat. No. 3,506,385 to Kurt Weber and George Cressman, and an example of a low voltage flash sequencing circuit is disclosed in U.S. Pat. No. 3,532,931 to Paul Coté and John Harnden. If the flash lamps in the multiple flash unit 17 are of the so-called high voltage type, requiring a pulse of approximately 1000 or 2000 volts or more, the firing pulse source 39 may comprise a suitable battery-capacitor discharge and voltage step-up transformer type of circuit, or preferably may employ a compact piezoelectric element arranged to be impacted or stressed in synchronization with opening of the camera shutter, so as to produce a firing pulse having a voltage of approximately 1000 or 2000 volts or more and of sufficient energy to fire a single flash lamp. An example of a high voltage flash lamp and a firing pulse source comprising a piezoelectric element synchronized with a camera shutter is described in U.S. Pat. Nos. 2,972,937 and 3,106,080 to C. G. Suits.

The circuit board 36 in FIG. 3 is shown in the orientation in which the connector tab 18 faces downwardly and is plugged into the socket 19, whereby the circuit board terminals 31, 32, and 33 respectively make electrical contact with the socket contacts 37, 38, and 37'. The circuit board terminal 31 is part of a continuous conductor run on the board, which is connected in common to one electrical lead wire (22a, 23a, 24a, etc.) of each of the eight flash lamps 22, 23, 24, etc., in the unit at points 41, 42, 43, 44, etc., by suitable means such as soldering, welding, or crimping. For the sake of clarity, only two flash lamps 24 and 25 are shown in FIG. 3, and in dashed lines. Suitable openings are provided through the reflectors at the bases of the lamps to permit the connections of the lead-in wires to the circuit board.

The circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected to the remaining lead wire of flash lamp 25 at 52, and terminates at a radiation switch terminal 53 which is near to but spaced from radiation switch terminal 46. A circuit board conductor run 56 is connected to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Radiation switches 66, 67, and 68 are respectively positioned to be in contact with and bridging across the respective pairs of switch terminals 46–53, 47–58, and 48–63. The material for the radiation switches 66, 67, and 68 may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches 66, 67, and 68 is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches 66–68 is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board. The terminal 33 on the plug-in tab 18 is connected, via a printed circuit run 71, to the connection point 45' for lamp 28, which is the first lamp to be flashed when the array is turned around so that terminals 31' and 32' are connected to the firing pulse source 39 via the socket 19. The connector terminals 32 and 33 flank the common connector terminal 31. Since the socket contacts 37 and 37' are electrically shorted together, they electrically short together the tab terminals 31 and 33, also at the same time shorting terminals 31' and 32' of the inactive lower group of lamps, thus electrically shorting the input of the circuitry for the inactive group of lamps. Similarly, when the unit is turned around, the socket contacts 37 and 37' will electrically short the terminals 31' and 33' and also terminals 31 and 32, thus shorting the input of the then inactive lamp circuit. This shorting of the inactive lamp circuit prevents accidental flashing of an inactive lamp by stray capacitive coupling of a firing pulse, as is described in detail in the above-referenced Blount patent application. Of course, this precaution is useful only when the inactive lamps have not yet been flashed, and is not necessary if they have already been flashed.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into the socket 16, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit of FIG. 3 functions as follows. Assuming that none of the four lamps in the upper half of the unit 17 have been flashed, upon occurrence of a first firing pulse from the source 39, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' attached to the socket 19, the group of lamps that then become uppermost and relatively farthest away from the lens axis will be in an active circuit and will be flashed in the same manner as has been described.

In accordance with the invention, a deformation 76 is provided in the tab 18 along and between at least a portion of the terminals 31 and 32, and a similar deformation 77 is provided along and between at least a portion of the terminals 31 and 33. These deformations may be in the form of grooves 78 and 79 as shown in FIG. 4, or ribs 81 and 82 as shown in FIG. 5, or slots 83 and 84 as shown in FIG. 6, or other suitable configurations, and function to increase the electrical leakage paths between the elongated exposed portions of adjacent terminals. Silmilar deformations 76' and 77' are provided in the tab 18' extending along and between the elongated exposed portions of the terminals.

The connector tab 18a in the embodiment of FIG. 7 employs a pair of outer terminal runs 32a and 33a which are electrically connected and function the same as terminals 32 and 33 (or 32' and 33') in the embodiments of FIGS. 1–6. The center commonly connected terminal 32a includes a portion 31b extending laterally across the tab between its end and the terminals 32a and 33a, as is more fully disclosed in the abovereference Coté patent application Ser. No. 485,460, and which functions to reduce the possibility of lamps being flashed by electrostatic charge when the tab 18a is grasped or comes into contact with another object and which also functions, when the tab 18a is plugged into the socket 19, to temporarily short out and discharge any residual voltage of the firing pulse source 39. In accordance with the present invention, angle-shaped deformations 76a and 77a are provided between and along at least a portion of the terminal 31a–31b and the respective outer terminals 32a and 33a, and can be in the form of grooves, ribs, slots (as shown in FIGS. 4, 5, and 6), or other suitable contours, extending between the exposed portions of these terminals.

The deformations 76, 77, etc., in the tabs between terminals function to reduce the likelihood of deposits of dirt, moisture, and other matter from forming a film on the tab surfaces between terminals which would partially short or reduce the normally very high resistance between adjacent terminals and therefore would partially short and dissipate energy of firing pulses whereby there might be insufficient remaining firing pulse energy to flash a lamp. The invention functions not only by increasing the electrical leakage path distance between adjacent terminals, but also functions to a large extent because the nature of the deformations in the tab surfaces between adjacent terminals makes it nearly impossible for a continuous film of skin moisture or oil to become deposited between terminals when the tab is touched or grasped by hand. This achievement is further enhanced by the preferred embodiments in which the deformations have one or more sharp edges extending along and between the exposed portions of the terminals, which further reduces the possibility that a continuous film can become formed between adjacent terminals.

It has been found that the invention achieves its objective of reducing the likelihood of flash failure, and achieves it in a manner that is feasible and economical to manufacture.

While preferred embodiments of the invention have been shown and described, various other embodiments and modifications thereof will become apparent to persons skilled in the art, and will fall within the scope of the invention as defined in the following claims. The term "camera" as used herein is intended to include a flsh adapter device for a camera.

What I claim as new and desire to secure by Letters Patent of the United States is:

1. An electrical flash lamp unit comprising a housing member containing a plurality of flash lamps, a connector tab extending from said housing member, said tab having first, second, and third electrical terminals arranged in a row in the named order on one side thereof and extending from said housing member toward the end of said tab, circuit means connecting said terminals with said lamps, said second terminal including a portion extending laterally of the tab between said end of the tab and the ends of the first and third terminals, said side of the tab being provided with first and second deformations respectively between said first and second terminals and said second and third terminals, said deformations being angular and extending substantially from said housing member toward opposite side edges of the tab, respectively, and being shaped to increase the electrical path between said first and second terminals and said second and third terminals.

2. A flash lamp unit as claimed in claim 1, in which said deformations are grooves.

3. A flash lamp unit as claimed in claim 1, in which said deformations are raised ribs.

4. A flash lamp unit as claimed in claim 1, in which said deformations are slots extending through said tab.

5. A flash lamp unit as claimed in claim 1, in which said deformations are each provided with at least one sharp edge extending laterally of the path between said terminals.

6. A circuit board for a planar flash array, comprising an elongated circuit board memeber having first and second integral tabs respectively at the ends thereof, a first group of pairs of flash lamp connection areas carried on said circuit board on a first half thereof that is nearest said first connector tab, a second group of pairs of flash lamp connection areas carried on said circuit board on a second half thereof that is nearest said second connector tab, three circuit runs carried on said circuit board, one end of the first of the circuit runs forming a first connector terminal on said first tab and the other end of the first circuit run forming a first connector terminal on said second tab, said first circuit run being connected electrically with one lamp connection area of each said pair thereof, a second of said circuit runs forming a second terminal on said first tab and the third of said circuit runs forming a second terminal on said second tab, switching circuitry connecting said second circuit run with the remaining lamp connection areas of said second group of lamps, and switching circuitry connecting said third circuit run with the remaining lamp connection areas of said first group of lamps, wherein the improvement comprises a first deformation provided on the surface of said first tab between said first and second terminals thereof and which is shaped to increase the electrical path therebetween, and a second deformation provided on the surface of said second tab between said first and second terminals thereof and which is shaped to increase the electrical path therebetween.

7. A circuit board for a planar flash array comprising an elongated circuit board member having first and second integral tabs respectively at the ends thereof, a first group of pairs of flash lamp connection areas carried on said circuit board on a first half thereof that is nearest said first connector tab, a second group of pairs of flash lamp connection areas carried on said circuit board on a second half thereof that is nearest said second connector tab, three circuit runs carried on said circuit board, one end of the circuit runs forming first, second, and third connector terminals arranged in a row in the named order across said first tab and the other end of the circuit runs forming first, second, and third connector terminals arranged in a row in the reverse of the named order across said second tab, the circuit run forming said second terminals being connected electrically with one lamp connection area of each pair thereof, switching circuitry connecting the second circuit run with the remaining lamp connection areas of said second group of lamps, and switching circuitry connecting the third circuit run with the remaining lamp connection areas of said first group of lamps, each of said tabs being provided with first and second deformations respectively between the first and second and the second and third terminals of the tab and which are shaped to increase the electrical paths between the respective first and second and the second and third terminals.

8. A circuit board as claimed in claim 7, in which said second terminal on each tab includes a portion extending laterally of the tab between the end of the tab and the ends of the first and third terminals of the tab, said deformations being angular and extending respectively from opposite side edges of the tab into the area of the tab.

* * * * *